(12) United States Patent
Wittmann et al.

(10) Patent No.: US 7,560,718 B2
(45) Date of Patent: Jul. 14, 2009

(54) METHOD FOR SENSING A MARKING ON A RUNNING WEB OF MATERIAL

(75) Inventors: Andrea Wittmann, Augsburg (DE); Juergen Eisen, Augsburg (DE); Martin Zeh, Biberbach (DE); Dominik Schild, Diedorf-Lettenbach (DE); Peter Sander, Graben (DE)

(73) Assignee: Texmag GmbH Vertriebsgesellschaft., Thalwil (CH)

( * ) Notice: Subject to any disclaimer, the term of this patent is extended or adjusted under 35 U.S.C. 154(b) by 145 days.

(21) Appl. No.: 11/479,351

(22) Filed: Jun. 30, 2006

(65) Prior Publication Data

US 2007/0001091 A1 Jan. 4, 2007

(30) Foreign Application Priority Data

Jul. 1, 2005 (EP) .................................. 05014314

(51) Int. Cl.
 *G01N 21/00* (2006.01)
(52) U.S. Cl. ............................ 250/559.07; 250/559.29; 250/559.44; 356/431
(58) Field of Classification Search ............ 250/559.05, 250/559.07, 559.08, 559.29, 559.44; 356/431, 356/237.2
See application file for complete search history.

(56) References Cited

U.S. PATENT DOCUMENTS

| 3,708,655 | A | 1/1973 | Schanne |
| 7,248,366 | B2 * | 7/2007 | Uesugi et al. ............... 356/431 |
| 2001/0042847 | A1 | 11/2001 | Eisen et al. |
| 2002/0154308 | A1 * | 10/2002 | Uesugi et al. ............... 356/431 |
| 2004/0089482 | A1 | 5/2004 | Ramsden et al. |

* cited by examiner

*Primary Examiner*—John R Lee
(74) *Attorney, Agent, or Firm*—Robert L. Epstein; Epstein Drangel Bazerman & James, LLP

(57) ABSTRACT

In the case of a method for sensing a marking (2) of a running web of material (3), the web of material is optically scanned by an image recording device (6). This generates in successive measuring cycles image signals which are fed to an image processing device (7). This image processing device (7) determines the positional values of the marking (2) of the web of material (3). A validity signal is generated from these positional values by applying a position-dependent weighting function and is output. This validity signal indicates whether the currently determined positional value is valid.

15 Claims, 1 Drawing Sheet

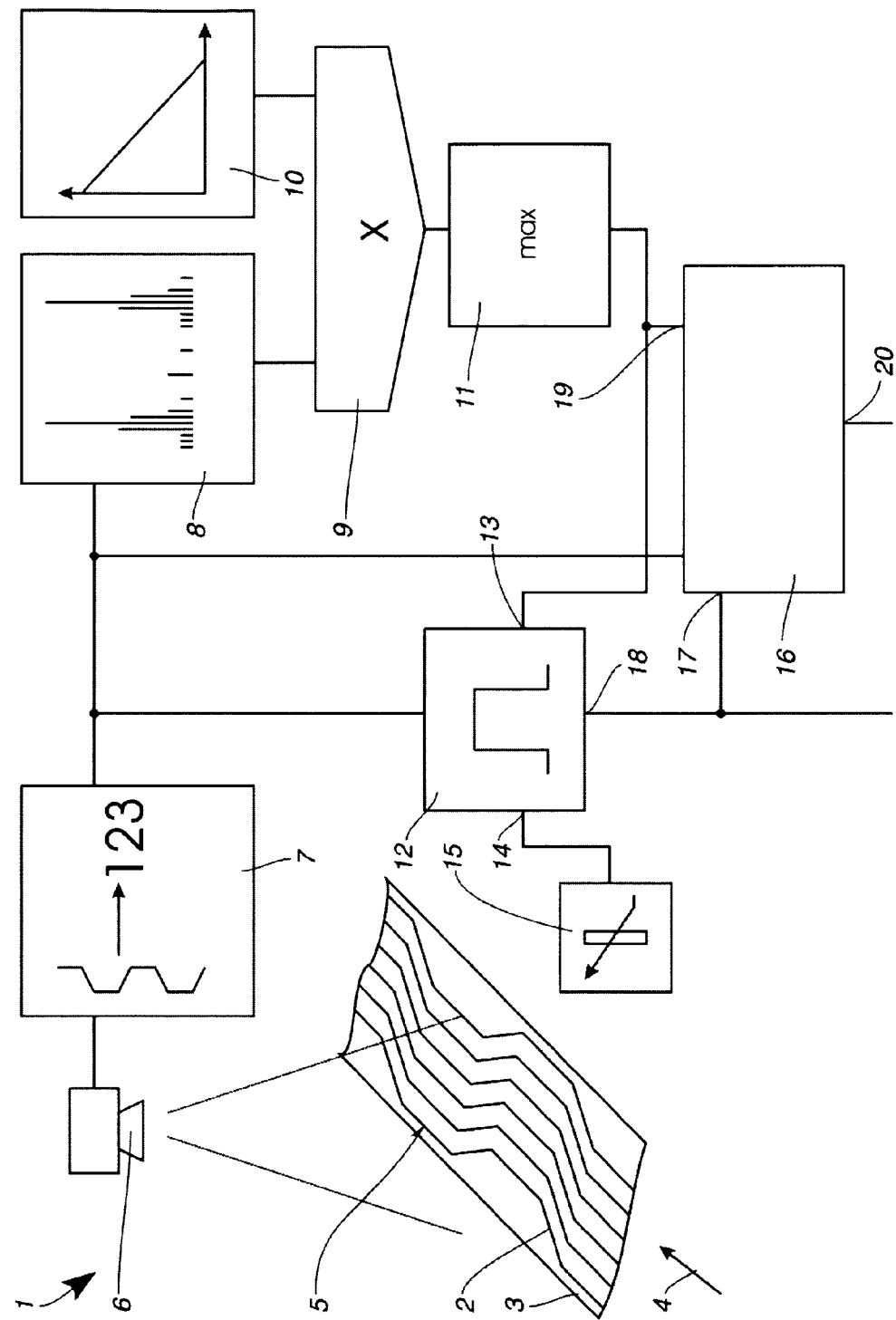

METHOD FOR SENSING A MARKING ON A RUNNING WEB OF MATERIAL

A method for sensing a marking on a running web of material is known from U.S. Patent Application Publication No. 2001/0042847. In the case of this method, a marking of the web of material is optically sensed continuously and a corresponding positional signal of the marking is generated. This method works outstandingly when the marking is provided throughout the web of material. Furthermore, there should not be any other optically detectable features in the viewing field of the optical sensor that could be falsely interpreted as a marking. Otherwise, with this known method an incorrect positional value would be measured and output.

The invention is based on the object of providing a method of the type mentioned at the beginning which operates reliably even when a marking is not provided throughout a web of material or a number of markings are present. This object is achieved according to the innovation as described in the claims.

In the case of a method for sensing a marking of a running web of material, the web of material is optically scanned by means of at least one image recording device. The scanning may in this case take place contactlessly, so that the running of the web is in no way hindered by it. A CCD camera in particular has been successfully used as the image recording device, although in principle a line camera aligned transversely in relation to the running direction of the web would be adequate. Alternatively, however, a matrix camera may also be used. Depending on how the marking is provided on the web of material, in simple cases the use of a black-and-white camera may be adequate, provided that it ensures adequate contrast. In difficult cases, however, the use of a colour camera is to be preferred, so that markings which do not stand out in the black-and-white image by adequate contrast can also be sensed. The marking itself may for example be printed on the web of material. Alternatively, however, it is also conceivable for the marking to be woven into a textile web of material or sewn on. It could be formed by a missing thread in the textile fabric or by a buckle fold in a cardboard or composite material. In the latter cases, although the marking does not produce any visible contrast on the surface of the web of material, when it is illuminated at an angle a characteristic light-dark edge is obtained and this can be evaluated optically. In this way, a wide variety of markings of the running web of material can be sensed. In particular in the case of woven-in or folded-in markings, there is a great application demand, since pattern-based marking detection of the web of material is possible in this way. For example, with this method it is possible to sense a textile web in its position and consequently to guide it, the guiding criterion being a pattern that is printed onto the textile web or woven into it. Alternatively, a web could also be guided directly on the basis of a previously applied folded edge. In the case of these guiding criteria, the markings that are present in the web of material are used directly, so that there is no need for a marking that is specifically designed as a guiding criterion to be additionally applied. This also dispenses with the need to align the additionally applied marking correctly with the actual guiding criteria. In this way, it is possible for example for a folded web of cardboard to be cut exactly at a predetermined distance from the folding lines or to be fed to a box-making machine exactly in line with the folds. However, a problem with these guiding criteria is that they are generally not always available or not always available in the correct position. Therefore, patterns in webs of material often have to be interrupted or are repeated in a distributed manner over the web of material. Folding lines in cardboard articles do not run in a straight line in the running direction of the web of material but instead follow a quite complex path, so that using these features directly as a guiding criterion would lead to measuring results that are incorrect and consequently unusable. If these measuring results were fed directly to a web running control system, chaotic control behaviour would be obtained. To avoid these problems, Patent Claim 1 proposes generating a validity signal from the determined positional values of the marking by applying a position-dependent weighting function. This validity signal indicates whether the currently determined positional value is valid. In the case of a downstream web running control system, this validity signal can be used for blocking the entire web running control as long as the validity signal indicates the invalidity of the output positional value. This leads to the downstream web running control system completely ignoring the incoming measured values and leaving the actuating elements in their position. The position-dependent weighting function in this case acts like a filter for the positional values that are determined, by which unusable positional values are detected and segregated. In this way, it is possible for example only to use the strip on the extreme left of a web of material printed with strips as a guiding criterion. If the strip does not occur because of the pattern, the positional value of the strip following on the right is indeed measured as the current positional value, but this positional value is marked as invalid by the built-in filter, in order to avoid misinterpretation of the sensed values taking place in this way. Even if the subject matter of the invention is explained on the basis of a web running control system, this is not to be understood as being restrictive. Rather, the method according to the invention can also be used within the scope of other applications. The direct quality control of the web of material without any control function or the detection of the web repeat are merely mentioned as examples.

In the case of a alternative method, the determined positional values are fed to a filter, which calculates its output value for the position of the marking. This filter thereby determines the output value from the positional values of various measuring cycles by applying a time- and position-dependent weighting function. The time dependence of the weighting function is preferably an exponential function falling away for times in the past, which gives greater weighting to the current measured values than those far back in time. Since the web of material is moved, this time dependence may also be interpreted as location dependence in the running direction of the web. The position dependence of the weighting function makes allowance for the validity assessment, so that valid positional values are given correspondingly greater weighting than invalid values. In the simplest case, the output value which the filter generates is the last positional value that satisfied the validity criterion of the weighting function. Alternatively, the filter may also provide a corresponding low-pass effect and sliding validity dependence of the measured values.

It is favourable if the weighting function is a peak function. Possible examples of such a peak function are a Gaussian function, a Lorentz function, a window function, a Bessel function, etc. Which specific peak function is to be used depends on the respective individual case. What is important is that the peak function has at least two parameters, namely the position of the peak and the characteristic line width. The characteristic line width is generally preset as a parameter and depends essentially on the type of web of material. If disturbing positional values occur only quite far away from the correct value, the line width can be set relatively generously. The sensing of the marking is thereby made very insensitive to disturbances. If, on the other hand, incorrect positional values may also lie relatively near the true value, the line width must be chosen to be correspondingly narrow. Only in this way is it possible to eliminate an adequate number of incorrect measurements from the output data stream by an appropriate invalidity signal or filtering. If only a very small number of incorrect measurements remain in the output data stream, there is an adequately small disturbing effect, so that reliable sensing of the marking is possible by means of averaging. On the other hand, a small line width always entails the risk that, if there is a sudden shift of the web of material, valid positional values are no longer detectable.

A window function being used as a weighting function is simple and has been successfully used in practice. This has been successfully used in particular in those cases in which invalid measured values are to be eliminated by an inactive validity signal. There are only two possible states for the validity signal, namely valid and invalid, so that a window function is entirely adequate. The window function assigns an active validity signal to all positional values inside a predetermined window and an inactive validity signal to all positional values outside the window.

While the line width of the peak function can be meaningfully set as a process parameter with the aid of various assumptions, this is not possible in the case of the peak position of the weighting function. Rather, the specific point at which a valid positional value will occur depends on the current running of the web. In order to determine this parameter, it is advantageous if the weighting function is influenced by the positional values of past measuring cycles. The past measuring cycles produce an overview of various possible actually occurring positional values, from which the correct positional value can be determined directly by applying appropriate mathematical operations. This overview is not obtained by considering solely the current positional value. It is therefore adequate to apply to the positional values of past measuring cycles an appropriate selection criterion which is application-dependent. For sensing the marking, a certain number of measuring cycles is accordingly always required before a measured value can be output. These measuring cycles are preferably obtained when the web of material is started. Merely as an example, such a selection criterion may be that of restricting the range of validity of the positional values to an area around the positional values found on the extreme left. However, it goes without saying that more complex selection criteria are also possible.

In order to allow selection criteria that are appropriate for as wide a variety of applications as possible to be processed, it is favourable if the weighting function is influenced by a statistical evaluation of the positional values of past measuring cycles. The positional values of past measuring cycles are thereby recorded in the manner of a histogram, in order to determine the frequency distribution. In this way, criteria such as the detection of the accumulation point on the extreme right may be taken into account with at least 10% of the measured values or similarly complex inquiries. The so-called outliers, which are to be found at an extreme point in the statistical evaluation, can in this way simply be suppressed.

In order that the sensing of the marking also works unproblematically in the case of a shifting web of material, the frequency distribution of the positional values is determined in a sliding manner. In this way, the frequency distribution of the positional values is constantly updated and the oldest positional values are eliminated from the statistics. In the case of a gradually shifting web of material, the peak of the weighting function is accordingly taken along with the shifting web of material, so that the evaluation of the positional values always remains possible. Although the frequency distribution always lags somewhat behind the current positional values in time, this can be compensated unproblematically at moderate shifting rates of the web of material by choosing a sufficient line width of the peak function. A validity criterion is continuously applied to the frequency distribution of the positional values determined in a sliding manner, in order to determine the mean position of valid positional values. This validity criterion directly influences the weighting function, in particular the peak function.

In the case of simple validity criteria, it is often sufficient if the frequency distribution is multiplied directly by a position-dependent function, in order to weight the different frequency points differently. The product function can then be evaluated with respect to the position of its maximum, which directly influences the weighting function, in particular the position of the peak. If, for example, apart from individual outliers, only few positions occur particularly frequently as a result of the pattern, the frequency distribution may for example be multiplied by a linear function, in order to give preference to the frequency point on the extreme left or extreme right. This preferred frequency point is then the absolute maximum of the product function and can be used with respect to its position directly as a validity criterion.

Further advantages and features of the present invention are explained in the following detailed description with reference to the associated figures, which contain a number of exemplary embodiments of the present invention. It should be understood, however, that the drawing only serves the purpose of illustrating the invention, and does not restrict the scope of protection of the invention. In the drawing:

BRIEF DESCRIPTION OF THE DRAWING

The single FIG. shows a schematic representation of a device 1 for sensing a marking 2 on a running web of material 3. In the exemplary embodiment shown, the marking 2 is printed onto the web of material 3.

DETAIL DESCRIPTION

The marking 2 is in this case the pattern that is present on the web of material 3 and it does not run in a straight line. Rather, in some portions the marking 2 runs in the running direction 4 of the web and in some portions it runs obliquely thereto. A web running control system (not represented) is intended to be influenced by this marking 2, the guiding criterion being the marking on the extreme left in those portions 5 in which the marking 2 is located on the extreme left. It goes without saying that other criteria may also be used.

For the optical sensing of the web of material 3, an image recording device 6 is provided in the form of a CCD camera. This image recording device 6 generates image signals, in which the information of the marking 2 is contained. These image signals are fed to an image processing device 7, which generates a positional signal for the marking 2 from the image signals obtained. For this purpose, the processing device 7 uses a customary edge seeking algorithm, which detects the positions of edges within the image signal.

The positional signals obtained with each measuring cycle are fed to a data sampler 8, which carries out a statistical evaluation of the positional signals obtained. This statistical evaluation provides that the frequency of the occurrence of various positional signals is recorded in the manner of a histogram and a frequency distribution function is output to a multiplier 9. The multiplier 9 forms the product of the histogram created by the data sampler 8 multiplied by an output signal of a function generator 10, which essentially generates a linear function. The output function of the function generator 10 thereby forms a weighting of the histogram which the data sampler 8 generates. The multiplication operation of the multiplier 9 has the effect that the frequency point on the left is given preference over that on the right, so that the output function generated by the multiplier 9 has a clear maximum. This maximum is determined by a maximum detector 11 and the position of the absolute maximum of the weighted histogram is determined. This positional value generated by the maximum detector 11 corresponds to the setpoint position of the marking 2 to be evaluated.

The positional signal generated by the image processing device 7 is also fed to a window comparator 12, which checks whether the positional signal lies inside the predefined window area. The window comparator 12 has a position input 13, which defines the centre position of the window. This position input 13 is connected to the output of the maximum detector 11. The window comparator 12 also has a window width input 14, which determines the width of the window. This window width input 14 is connected to a value generator 15, which prescribes a predefined value for the window width of the window comparator 12. This value is generally adjustable.

The positional signal of the image processing device 7 is also connected to a filter 16, which has a low-pass effect. The filter 16 also has a validity input 17, which is connected to an output 18 of the window comparator 12. The filter 16 is in this case constructed in such a way that it only accepts new positional signals at its input 19 if there is a positive validity signal at the validity input 17. In this way, positional signals of the image processing device 7 that do not correspond to the preset criterion are suppressed by the filter 16. An output 20 of the filter 16 emits a signal which essentially follows the positional signal of the processing device 7, provided that there is a positive validity signal at the validity input 17. If, on the other hand, it is indicated at the validity input 17 that the current measured values are invalid, the filter 16 keeps the last output value constant at its output 20. In this way, positional signals which lie in regions of the marking 2 outside the portion 5 or originate from other markings are prevented from being passed to the filter output 20. In addition, the validity signal is output at the validity output 18, indicating whether invalid positional signals are currently being achieved. This validity signal may serve for example for indicating to a downstream control system that the current signals cannot be used and the control is to be blocked.

Since a number of exemplary embodiments of the present invention have not been shown or described, it should be understood that a large number of changes and modifications to these exemplary embodiments described are possible without departing from the essential idea and the scope of protection of the invention defined by the claims.

LIST OF REFERENCE NUMERALS

1 device
2 marking
3 web of material
4 running direction of web
5 valid portion
6 image recording device
7 image processing device
8 data sampler
9 multiplier
10 function generator
11 maximum detector
12 window comparator
13 position input
14 window width input
15 value generator
16 filter
17 validity input
18 validity output
19 filter input
20 filter output

The invention claimed is:

1. Method for sensing a marking of a running web of material, in which the web of material is optically scanned by means of at least one image recording device, which in successive measuring cycles generates image signals which are fed to an image processing device, which determines the position of the marking from the image signals and outputs positional values, characterized in that a validity signal which indicates whether a particular positional value is valid is generated by applying a position-dependent weighting function to at least some of said positional values.

2. Method according to claim 1, characterized in that the positional values are fed to a filter, which calculates an output value for the position of the marking from the positional values of various measuring cycles by applying a time- and position-dependent weighting function.

3. Method according to claim 1, characterized in that the weighting function is a peak function.

4. Method according to claim 3, characterized in that the peak function is a window function.

5. Method according to claim 1, characterized in that the weighting function is influenced by the positional values of past measuring cycles.

6. Method according to claim 5, characterized in that the weighting function is influenced by a statistical evaluation of the positional values of past measuring cycles.

7. Method according to claim 1, characterized in that the positional values have a frequency distribution that is determined in a sliding manner, to which frequency distribution a validity criterion is applied in order to determine the mean position of the valid positional values which influence the weighting function.

8. Method according to claim 7, characterized in that the frequency distribution of positional values is multiplied by a position-dependent function and the position of the maximum of the product function influences the weighting function.

9. Method for sensing a marking of a running web of material, in which the web of material is optically scanned by means of at least one image recording device, which in successive measuring cycles generates image signals which are fed to an image processing device, which determines the position of the marking from the image signals and outputs positional values, characterized in that the positional values are fed to a filter, which calculates an output value for the position of the marking from the positional values of various measuring cycles by applying a time and position-dependent weighting function.

10. Method according to claim 9, characterized in that the weighting function is a peak function.

11. Method according to claim 10, characterized in that the peak function is a window function.

12. Method according to claim 9, characterized in that the weighting function is influenced by the positional values of past measuring cycles.

13. Method according to claim 12, characterized in that the weighting function is influenced by a statistical evaluation of the positional values of past measuring cycles.

14. Method according to claim 9, characterized in that the positional values have a frequency distribution that is determined in a sliding manner, to which frequency distribution a validity criterion is applied in order to determine the mean position of the valid positional values which influence the weighting function.

15. Method according to claim 14, characterized in that the frequency distribution of positional values is multiplied by a position-dependent function and the position of the maximum of the product function influences the weighting function.

* * * * *